US008797851B2

(12) United States Patent
Lewin-Eytan et al.

(10) Patent No.: US 8,797,851 B2
(45) Date of Patent: Aug. 5, 2014

(54) LOCATING TRAFFIC REDUCTION UTILITIES IN COMMUNICATION NETWORKS

(75) Inventors: Liane Lewin-Eytan, Binyamina (IL); Joseph Naor, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 108 days.

(21) Appl. No.: 13/449,328

(22) Filed: Apr. 18, 2012

(65) Prior Publication Data

US 2013/0279327 A1    Oct. 24, 2013

(51) Int. Cl.
  *G01R 31/08*    (2006.01)
(52) U.S. Cl.
  USPC .......................................... 370/229; 370/242
(58) Field of Classification Search
  USPC ........................................................ 370/229
  See application file for complete search history.

(56) References Cited

U.S. PATENT DOCUMENTS

| | | | |
|---|---|---|---|
| 7,400,264 B2 | 7/2008 | Boaz | |
| 7,664,876 B2 | 2/2010 | Garcia-Luna-Aceves et al. | |
| 7,694,065 B2 | 4/2010 | Petev et al. | |
| 2002/0184607 A1* | 12/2002 | Alpert et al. | 716/15 |
| 2004/0215883 A1 | 10/2004 | Bamford et al. | |
| 2005/0152286 A1* | 7/2005 | Betts et al. | 370/255 |
| 2005/0197993 A1* | 9/2005 | Korotky | 706/52 |
| 2006/0049468 A1* | 3/2006 | Cheng et al. | 257/401 |
| 2006/0271655 A1 | 11/2006 | Yoon et al. | |
| 2006/0291388 A1 | 12/2006 | Amdahl et al. | |
| 2007/0286097 A1* | 12/2007 | Davies | 370/255 |
| 2008/0002655 A1 | 1/2008 | Logvinov et al. | |
| 2008/0298252 A1 | 12/2008 | Yonge et al. | |
| 2009/0034419 A1 | 2/2009 | Flammer et al. | |
| 2009/0052321 A1* | 2/2009 | Kamath | 370/235 |
| 2009/0086632 A1 | 4/2009 | Folkes et al. | |
| 2009/0198790 A1 | 8/2009 | Grevers, Jr. | |
| 2009/0281673 A1 | 11/2009 | Taft | |
| 2010/0265825 A1* | 10/2010 | Blair et al. | 370/236 |
| 2011/0051702 A1* | 3/2011 | Billhartz et al. | 370/338 |
| 2011/0181437 A1 | 7/2011 | Gershinsky et al. | |
| 2011/0184676 A1 | 7/2011 | Gershinsky et al. | |
| 2011/0185079 A1 | 7/2011 | Gershinsky et al. | |
| 2012/0057603 A1* | 3/2012 | Allan et al. | 370/402 |
| 2013/0107712 A1* | 5/2013 | Allan | 370/235 |

OTHER PUBLICATIONS

Wang et al., "Compressing Electrical Power Grids", Appeared in Smart Grid Communications, 2010.

(Continued)

*Primary Examiner* — Gerald Smarth

(57) ABSTRACT

A method of locating traffic reduction entities in a communication network, optionally where at least one reduction entity is located within each network path which allows traffic flow between endpoints and central stations. The method comprises assigning a plurality of allocation cost values each estimating cost of locating of one of a plurality of traffic reduction entities on one of a plurality of intermediate nodes of a communication network, calculating a plurality of excess load cost values each calculated according to excess load cost between two adjacent intermediate nodes of the plurality of intermediate nodes, identifying a node set selected from the plurality of intermediate nodes using a target function based on the plurality of cost values and the plurality of excess load cost values, and outputting instructions for locating the plurality of traffic reduction entities on the communication network according to the node set.

18 Claims, 4 Drawing Sheets

(56) References Cited

OTHER PUBLICATIONS

Tewari et al., "Beyond Hierarchies: Design Considerations for Distributed Caching on the Internet", Technical Report TR98-04, Department of Computer Science, University od Texas at Austin, Feb. 1998.

Adrian Clark and Christopher J. Pavlovski, "Wireless networks for the smart energy grid: application aware networks", proceeding of the international MultiConference of engineers and computer scientists 2010 vol. 2 IMECS 2010, Mar. 17-19, 2010, Hong-Kong.

IBM, "Data-quality-aware volume reduction in smart grid networks", Last visited on May 26, 2011 URL: http://researchweb.watson.ibm.com/haifa/projects/software/bridging/traffic.shtml.

Wenpeng Luan et al., "Smart grid communication network capacity planning for power utilities", 2010 IEEE.

Tarek Khalifa et al., "Transport protocol for smart grid infrastructure", 2010 IEEE.

\* cited by examiner

LOCATING TRAFFIC REDUCTION UTILITIES IN COMMUNICATION NETWORKS

BACKGROUND

The present invention, in some embodiments thereof, relates to communication network design and, more specifically, but not exclusively, to traffic usage optimization within communication networks.

In advanced distributed networks, the amount of data to be transferred within the network may exceed the bandwidth capacity resources of the network infrastructure. Possible outcomes of traffic overload are increased latency, network congestion, loss of data, and failures.

Flow control and traffic engineering methods may be used to overcome such problems. These methods are applied online during network operation, and respond to the current state of the network, or to the near predicted future. As such, they allow preventing network congestion in the presence of short bursts of data generation, but are ineffective when the average data generation rate exceeds network capacity.

During the network design phase, utilities performing traffic reduction may be located within the network. These utilities capture the massive amount of data originated by end-points, and reduce the data volume sent onwards, resulting in significantly lower volume of data forwarded from the utilities onwards than the volume which was originally sent up to the utilities. Prominent examples of traffic reduction usage may be found in active management networks such as the power smart grid and in hierarchical large scale distributed caches across the internet.

SUMMARY

According to an aspect of some embodiments of the present invention there is provided a computerized method of locating traffic reduction entities in a communication network. The method comprises calculating a plurality of allocation cost values each estimates locating cost of one of a plurality of traffic reduction entities on one of a plurality of intermediate nodes of a communication network, calculating a plurality of excess load cost values each calculated according to the bandwidth capacity and the expected flow load between two adjacent intermediate nodes of the plurality of intermediate nodes, identifying a node set selected from the plurality of intermediate nodes using a target function based on the plurality of allocation cost values and the plurality of excess load cost values, and outputting instructions for locating the plurality of traffic reduction entities on the communication network according to the node set.

According to an aspect of some embodiments of the present invention there is provided a computerized method of enabling traffic reduction operation on a plurality of intermediate nodes linked in a communication network in real time. The method comprises monitoring changes in at least one of a plurality of allocation cost values, each calculated according to at least one change in operation cost of one of the plurality of intermediate nodes as a traffic reduction entity, monitoring changes in at least one of a plurality of excess load cost values, each calculated according to excess load cost between two adjacent intermediate nodes of the plurality of intermediate nodes, identifying a node set selected from the plurality of intermediate nodes using a target function based on the plurality of allocation cost values and the plurality of excess load cost values and enabling traffic reduction operation on a plurality of members in the node set.

According to an aspect of some embodiments of the present invention there is provided a system for mapping traffic reduction entities on a plurality of intermediate nodes of a communication network. The system comprises a processor, a cost allocation module which calculates a plurality of allocation cost values, each of location cost of one of a plurality of traffic reduction entities on each of the plurality of intermediate nodes, a load calculation module which calculates traffic excess load cost values, each by estimating load capacity and expected traffic load between two adjacent intermediate nodes of the plurality of intermediate nodes in the communication network, a node selection module which selects a node set from the plurality of intermediate nodes according to a target function based on the allocation cost values and the excess load cost values, and an output module which produces instructions for locating traffic reduction entities on the communication network according to the node set.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
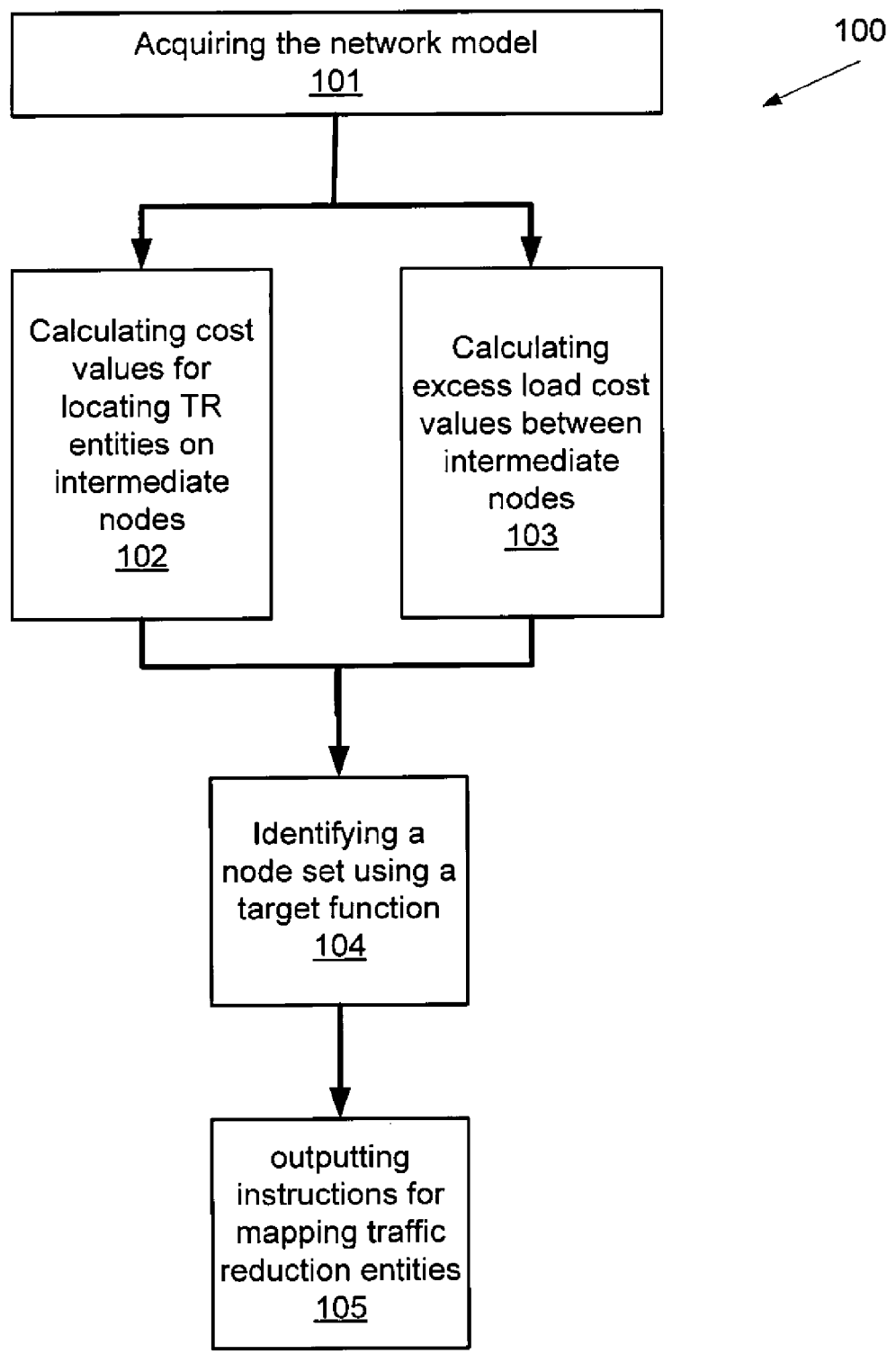
FIG. 1 is a flowchart of a method for locating traffic reduction entities on a plurality of intermediate nodes linked in a communication network, according to some embodiments of the present invention.

The present invention, in some embodiments thereof, relates to communication network design and, more specifically, but not exclusively, to traffic usage optimization within communication networks.

According to some embodiments of the present invention, there are provided methods and systems of locating traffic reduction entities within a communication network according to the cost of allocating traffic reduction entities in different network nodes and excess load cost of different traffic links connecting adjacent network nodes of the communication network.

In some embodiments, the methods and systems enable pre-defined mapping of reduction entities on network nodes according to the entire network topology in the network design phase, optionally within the limits of a given budget and/or based on a given pool of reduction entities. The methods and systems illustrated herein can also be used to map reduction entities within the network such that a constraint is met according to which at least one reduction entity is located along every network path. Each of the network paths considered serves to allow traffic flow between selected endpoints and central stations, serving as source nodes and destination nodes.

Optionally, the network is modeled as consisting of a hierarchical structure. The root represents a central station, leaves correspond to the end-points, and inner nodes represent network devices such as servers where a traffic reduction utility may be located. In other topologies, a number of central stations may be used.

For example, the network is a smart power grid, where digital meters are linked by an intelligent delivery network which bridges the communication gap between a central management utility and the low and/or medium voltage parts of a grid infrastructure covering end consumers and substations. In such embodiments, the root represents a central power control utility and the leaves represent smart meters.

Another example is that of hierarchical large scale cache nodes distributed across a network, such as the interne. The cache nodes decrease traffic load on the way up within the hierarchy as each cache node reduces the number of requests sent upwards. In this example, the root may represent a root cache node and the leaves correspond to clients of interne users requesting web pages.

Reduction entities mapping considerations include traffic load (i.e. congestion) over the limited capacities of the network links, and the cost of resources required for establishing a volume reduction entity at intermediate network nodes.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Reference is now made to FIG. 1, which is a flowchart of a method 100 for locating traffic reduction entities on a plurality of intermediate nodes linked in a communication network, according to some embodiments of the present invention. The method considers the architecture and arrangement of network nodes, traffic load (congestion) over the limited capacities of the network links, and the cost of resources required for establishing and allocating a volume reduction entity at intermediate network nodes. The method allows identifying an arrangement of reduction entities that increases their utility within a network topology. In such a manner, load reduction is achieved in a lower cost. The arrangement may be referred to herein as a solution defining the location of traffic reduction utilities within the network.

Figure 2:
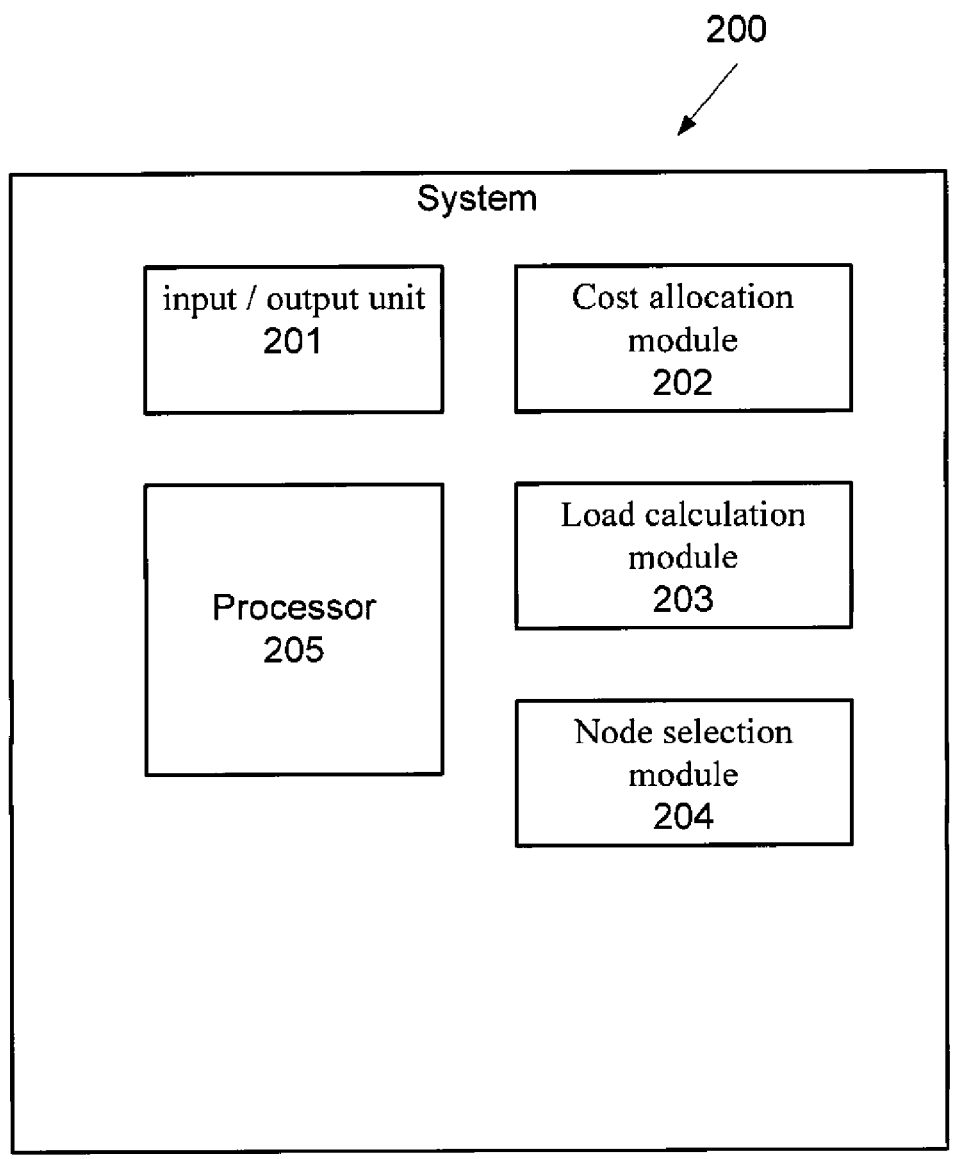
FIG. 2 is a relational view of software and hardware components of a system for locating traffic reduction entities on a plurality of intermediate nodes linked in a communication network, according to some embodiments of the present invention.

Reference is also made to FIG. 2, which is a relational view of software and hardware components of a system 200 for generating instructions to locate traffic reduction entities on a plurality of intermediate nodes linked in a communication network, according to some embodiments of the present invention.

The system 200 includes an interface serving as an input/output interface 201, a cost allocation module 202, a load calculation module 203, a node selection module 204, and a processor 205. For brevity, it should be noted that computing functions described herein may be performed using the processor 205.

The method 100 and system 200 may be implemented as a network design platform, an add-on to an existing network design platform, and/or as a software as a service (SaaS) which provides services for users via client terminals.

As shown at numeral 101 of FIG. 1, first, the interface 201 acquires, for example receives or accesses, a hierarchical network topology model having a plurality of end points connected to one or more central stations via a plurality of intermediate nodes. The model may be received as a file, indicated by a link to a file, scanned from a document, and/or the like.

Figure 3:
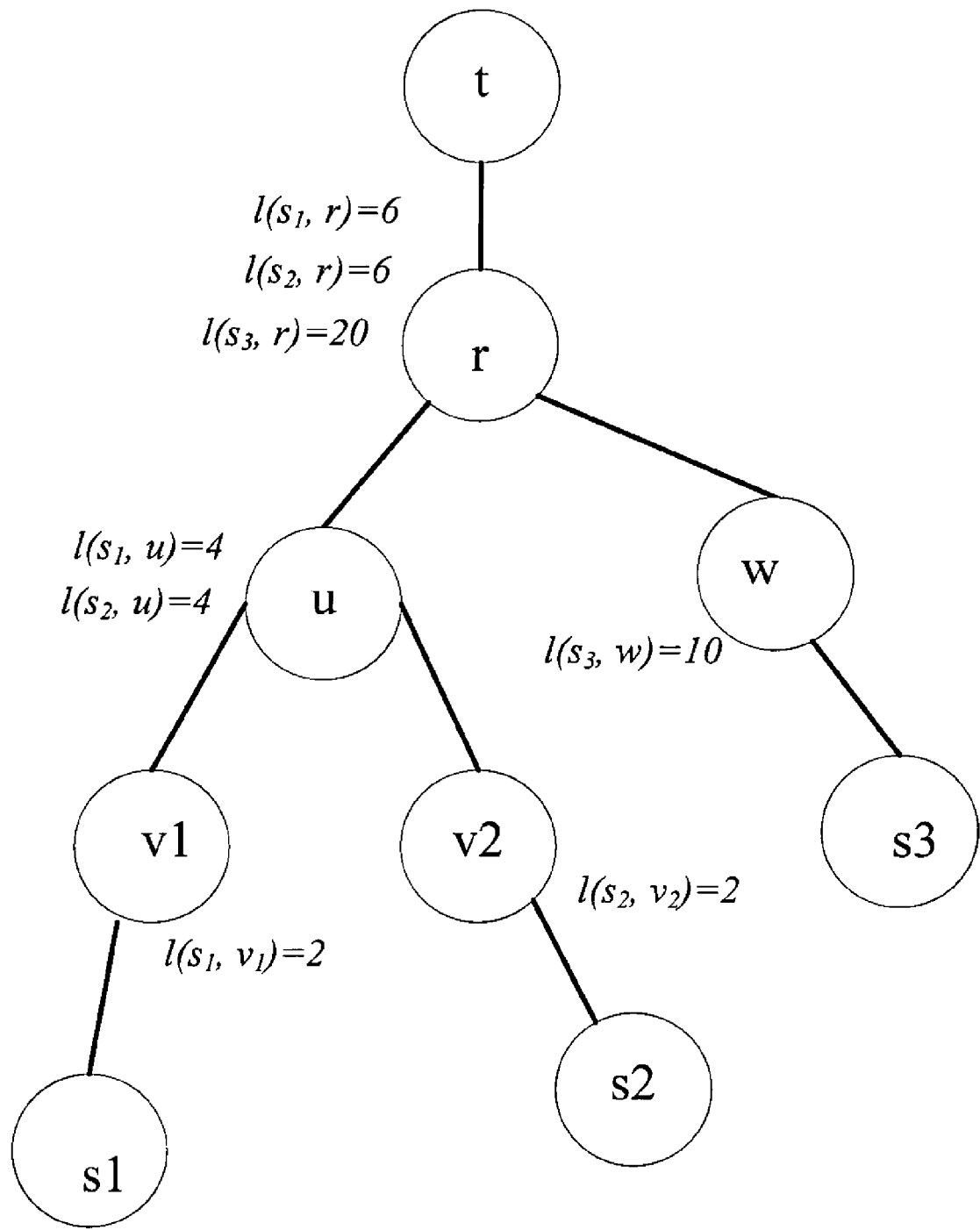
FIG. 3 is a schematic illustration of a tree graph modeling a very simple network infrastructure, according to some embodiments of the present invention.

An exemplary tree-graph model of a very simple network topology is shown in FIG. 3. In this figure, leaves s1, s2 and s3 denote endpoints, vertices r, u, w, v1 and v2 denote intermediate nodes, and root t denotes a central station.

As shown at 102, the system 200, for example the cost allocation module 202, assigns a cost or calculates the cost of allocating or opening a traffic reduction entity at each of the intermediate nodes in the network. The term $c_v$ indicates the cost of locating a traffic reduction entity at intermediate node v. The cost of locating or opening a traffic reduction entity may be calculated according to the resources which are required to allow the traffic reduction entity to function properly. Different traffic reduction entities may use different resources, for example CPU resources, power, memory, quality of service routing agents and/or the like. The value $c_v$ models the mandate and ability of an intermediate node v to function as a traffic reduction entity, and can also be considered as the cost of allocating the required resources at intermediate node v. There are nodes where reduction entities cannot be located due to reasons such as restricted resources or lack of processing capacities on the node. Reduction entities also cannot be located on nodes with a restricted local environment, for example and without limitation the network endpoints modeled as leaves in a tree graph. For such nodes, the value $c_v$ is set to infinity.

As shown at 103, the system 200, for example the load calculation module 203 calculates excess load cost values between intermediate nodes. Excess load cost values can be determined according to the bandwidth capacity of the links, the expected flow load on the links, or the like.

The term $l(s_i, v)$ indicates the excess load of the data between source $s_i$ and node v. In case the nearest traffic reduction entity from $s_i$ is located at v, the value $l(s_i, v)$ represents the total excess load affecting all edges in the path $p(s_i, v)$. The load $l(s_i, v)$ is optionally calculated using a non-decreasing function of the distance between $s_i$ and v. The excess load value is computed with respect to the bandwidth capacity of the links and the amount of flow expected from $s_i$.

Then, as shown at 104, the system 200, for example the node selection module 204 identifies an intermediate node set R using a target function. In some embodiments, the target function reflects a total cost for a traffic reduction location (TRL) solution. The total cost is composed of a combination allocation cost and excess load cost for the nodes according to the intermediate node set R selected by module 204. Such a target function will be referred to herein as a cost function.

Then, as shown at 105, the interface 201 outputs instructions for locating a plurality of traffic reduction entities on intermediate nodes of the network based on the node set R.

Figure 4:
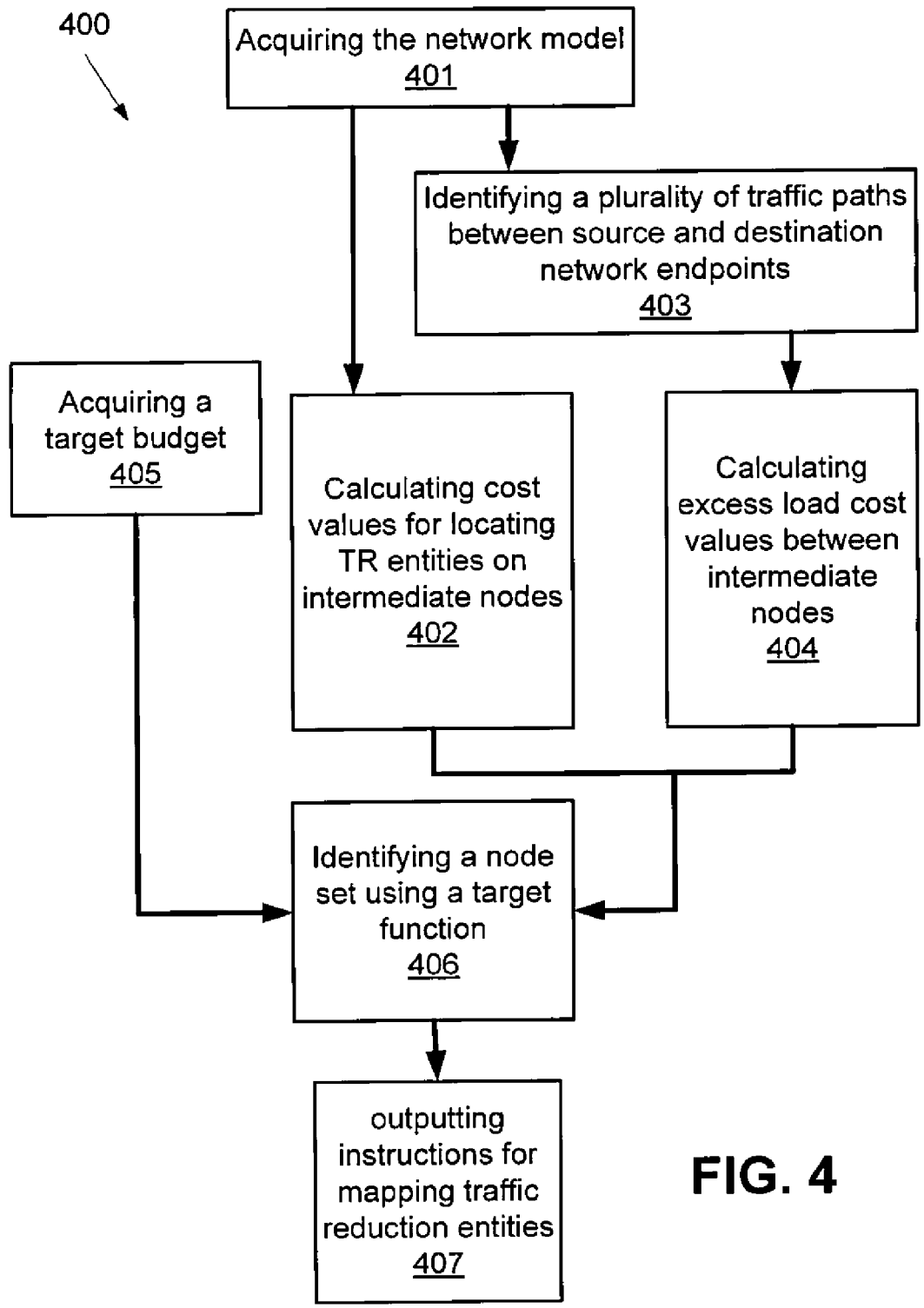
FIG. 4 is a flowchart of a method for locating traffic reduction entities on a plurality of intermediate nodes linked in a communication network, according to some embodiments of the present invention.

Reference is now made to FIG. 4, which is a flowchart of a method 400 for locating traffic reduction entities on a plurality of intermediate nodes linked in a communication network, according to some embodiments of the present invention. In these embodiments, additional factors are considered to identify a target node set on which traffic reduction entities will be positioned.

As shown at numeral 401 of FIG. 4, the method acquires a hierarchical network topology model having a plurality of end points connected to one or more central stations via a plurality of intermediate nodes. The model may be received as a file, indicated by a link to a file, scanned from a document, and/or the like.

An optional path recognition module may use the network topology model to identify a plurality of traffic delivery paths, as indicated by numeral 403. The paths indicate optional traffic flows between each of the plurality of endpoints and each of the one or more central stations. Each of the paths is indicated by intermediate nodes enabling traffic delivery along the path. The term $p(s_i, v)$ indicates a path for data transfer along a network traveling from source $s_i$ to destination v, for example and without limitation from an endpoint station $s_i$ to an intermediate node v. The infrastructure of the network here is known, so no need for path discovery. then The paths are either pre-defined by the network infrastructure, or alternatively identified by network path discovery techniques. For example, a message can be broadcasted from a root node. Each intermediate node along the path may add itself to a list, until the message reaches the leaves. At this point, the path is fully specified, then the leaves can send the message back to the root node.

For example, in the tree-graph model of FIG. 3 path recognition module identifies paths from each of leaves $s_1, s_2$ and $s_3$ to root t. For example, path $p(s_1, t)$ includes nodes $v_1$, u and r.

Optionally, as described in FIG. 4, the method 400 calculates the cost of locating, opening, or enabling the operation of a traffic reduction entity at each of the intermediate nodes in the network 402 and calculates excess load cost values between intermediate nodes 404.

Calculating excess load cost values between intermediate nodes 404 may be based on the traffic paths identified from the network topology. For example, load cost values may gradually increase along the path as the longer is the path the higher is the load on the network.

In this embodiment, a target budget is acquired, as shown at numeral 405. The budget may reflect the maximal total cost values allowed for locating traffic reduction entities within the network, a limited pool of reduction entities to be located within the network, or other constraints related to the location of traffic reduction entities within the network or to the load that can be tolerated within the network.

Then, as shown at 406, an intermediate node set R is identifies using a target function. The target function typically aims to find the solution with minimal total cost. In other embodiments, the target function may take into consideration a target budget, and the selection of the node set for locating traffic reduction entities on the network reflects the constraints indicated by the target budget. Outputting instructions for locating a plurality of traffic reduction entities on intermediate nodes of the network 407 is based on the selected node set.

The objective cost function may be defined, for example and without limitation, as follows:

$$\sum_{TR\ nodes\ v} c_v + \sum_{i=1}^{n} \left( \sum_{(first\ TR\ Node\ v) \in p_i} l(s_i, v) \right)$$

This function considers the sum of the opening costs of all traffic reduction entities in the network (cv for every intermediate node v) and the total excess traffic load defined between the end-points and the reduction entities (l(si, v) for each of endpoint si). In this example, the load of reduced volumes after passing through reduction entities is not considered, as the reduced volumes may be supported by the resource capacities of the underlying network and therefore are not considered excessive after being reduced.

An exemplary formulation of a linear program for calculating a traffic reduction location solution within a network, according to some embodiments of the present invention is shown herein:

Minimize $$\sum_{v \in V} c_v \cdot y_v + \sum_{i=1}^{n} \sum_{v \in \tilde{p}_i} l(s_i, v) \cdot x_{i,v} \text{ s.t.}$$

For each flow $f_i$:

$$\sum_{v \in \tilde{p}_i} x_{i,v} \geq 1$$

For each flow $f_i$ and node v: $x_{i,v} \leq y_v$

In the formulation, the value for $y_v$ can be either 0 if there is no reduction entity at node v or 1 if there is a reduction entity at node v. If it is allowed to be any value between 0 and 1, then this is called a "relaxation" of the problem, and after solving it there is an additional algorithmic step that should be performed in order to round the output to a 0/1 solution.

This formulation models the network infrastructure architecture by a directed acyclic graph G, where a single directed path p(v,w) exists between any pair of vertices v,w. Inner nodes of G correspond to intermediate control nodes (represented by the set V), leaf nodes correspond to end-points, and sink nodes correspond to the main control and operating centers.

The linear program shown herein calculates a solution for minimizing the cost of locating traffic reduction entities along each of the identified traffic paths within the network, and reflects a constraint according to which each flow passes through a reduction entity, that is, there is at least one reduction entity between each source and destination (not including source and destination).

Input for the program consists of a set of potential flows (streams), where a flow models data that will need to be sent over the network in a path $p(s_i, t_i)$ from a source endpoint $s_i$ to a destination/target endpoint $t_i$. Each path $p(s_i, t_i)$ in G is indicated by $p_i$, and the inner nodes of path $p(s_i, t_i)$ without nodes si, ti are indicated by $\sim p_i$.

In the integral version of the problem, the variables $y_v \in \{0, 1\}$ define whether a traffic reduction entity is located at node v, while the variables $x_{i,v} \in \{0, 1\}$ define whether flow $f_i$ is reduced at v. In an optimal integral solution, $x_{i,v}=1$ for the node v closest to $s_i$ for which $y_v=1$. The first set of constraints (1) specifies that there is at least one reduction entity on the path of each flow. The second set of constraints (2) specifies that the traffic of $f_i$ may be reduced at v up to $y_v$. In the integral solution, this simply means that the traffic may be reduced at node v only if there is a traffic reduction entity located at v.

An exemplary dual linear program for calculating a traffic reduction location solution within a network, according to some embodiments of the present invention is shown herein:

Maximize $$\sum_{i=1}^{n} \alpha_i \text{ s.t.}$$

For each flow $f_i$, and node $v \in \tilde{p}_i$: $\alpha_i - \beta_{i,v} \leq l(s_i, v)$
For each node v:

$$\sum_{i | v \in \tilde{p}_i} \beta_{i,v} \leq c_v$$

Outlined herein is a primal-dual algorithm for a linear program computing an integral solution for locating traffic reduction entities within a network, according to some embodiments of the present invention.

---

Algorithm 1 TRL Algorithm

1: Initialization: $\forall f_i, \forall v \in V$: $\alpha_i = 0$, $\beta_{i,v} = 0$. $\mathcal{R} = \emptyset$
2: for each vertex v in non-increasing order of depth do:
3:     Let $\mathcal{F}_j$ be the set of all flows $f_i$ for which $lca(s_i, t_i) = v$.
4:     Increase $\alpha_i$ for all flows $f_i \in \mathcal{F}_j$.
5:     for all flows $f_i \in \mathcal{F}_j$ and nodes $v \in \tilde{p}_i$ such that $\alpha_i \geq l(s_i, v)$ do:
6:         ▷ v is called usable
7:         Increase $\beta_{i,v}$ and $\alpha_i$ in parallel.
8:         Stop increasing variables of $f_i$ when there is a usable node $v_i^* \in \tilde{p}_i$ such that -continued Algorithm 1 TRL Algorithm

```
          Σ_{z|v*_i ∈ p_z} β_{z,v*_i} = c_{v*_i}.
 9:          R ← R ∪ {v*_i}.
10:       end for
11:   end for
12:   Let v_1, v_2, ..., v_k be the ordered list of nodes in R.
13:   for j = k down to 1 do:        ▷ Reverse delete
14:       if (R − v_j) contains usable nodes for all flows f_i then
15:           R ← R − {v_j}
16:       end if
17:   end for
18:   Output R.
```

The algorithm computes a solution with nearly minimal cost for determining the intermediate nodes where traffic reduction entities should be located along the path of each flow.

The algorithm computes an integral solution bounded by the dual objective function up to a factor of 2, thus achieving a 2-approximation solution. The algorithm is presented for the more general case of undirected acyclic graphs and is not constrained to hierarchical structures modeled by a directed tree.

R denotes the set of inner vertices picked by the algorithm as locations of traffic reduction entities. Tree G is rooted at an arbitrary vertex (in case of a directed tree, the root is already set). The depth of a node v is defined to be the length of the path between v and the root. For two nodes u, v, let lca(u, v) denote the lowest common ancestor of u and v, that is, the minimum depth node on path p(u, v).

The algorithm proceeds in iterations, and starts with an empty set R and a zero dual solution where $\alpha_i=0$ and $\beta_{i,v}=0$ for all flows and nodes. In each iteration, the algorithm picks the deepest unprocessed node, and updates only variables of flows $f_i$ such that v is the lowest common ancestor of $s_i$, $t_i$. In case of a directed tree, the node v picked at each iteration is the deepest unprocessed destination node, and the flows considered at that iteration are flows $f_i$ for which $t_i=v$.

$F_j$ denotes the set of flows considered during iteration j. The dual variables of the flows in $F_j$ are updated as follows: For all flows $f_i \in F_j$, $\alpha_i$ is greedily increased. Each node $v \in p_i$ for which $\alpha_i \geq l(s_i, v)$ becomes "usable" for $f_i$. For each usable node v of $f_i$ the variable $\beta_{i,v}$ is increased at the same rate as $\alpha_i$, so as to keep constraint 3 in FIG. 6. Variables $\beta_{i,v}$ of usable nodes, as well as variables $\alpha_i$ are increased for each flow fi∈Fj until there is an inner node $v^* \in p_i$ for which $\Sigma_{(z/v^* \in p-z)} \beta_{z,v^*} = c_{v^*}$ (constraint 4 in FIG. 6). Each such node is declared tight and is added to R. There might be non-zero variables $\beta_{z,v}$ of flows $f_z \notin Fj$ contributing to the sums. These are flows that were considered in previous iterations, and thus their values $\beta_{z,v}$ now stay fixed. Note also that a node v becoming usable for $f_i$ might already be tight from previous iterations.

After all iterations, R will be a feasible solution for traffic reduction location problem, as each flow will have at least one usable node on its path where a TR entity may be located. However, the solution might have redundant nodes. To remove them, a reverse delete step is performed. Denote by $v_1, v_2, \ldots, v_k$ the nodes in R according to their order of addition. Nodes are considered in the reverse of the order in which they were added to R. A node $v_l$ is deleted from R if after its deletion, each flow $f_i$ has at least one usable node in R.

This algorithm computes a solution with at most twice the cost of the optimal solution. If $(s_i, t_i)$ are a pair of nodes with at least one non-zero variable $\beta_{i,v}$, and lca($s_i, t_i$)=w, then the traffic reduction location solution locates at most one traffic reduction entity within each of the two path segments, $s_i$ to w, and $t_i$ to w. In case of a directed tree, the traffic reduction location solution locates at most one traffic reduction entity within the path p($s_i$, $t_i$) of each flow $f_i$ with non-zero variables β.

The traffic reduction location algorithm computes a 2-approximation to the optimum solution for the general case of an undirected acyclic graph. In case of a directed tree, the algorithm computes an optimal solution.

A different algorithm can be used to reflect other constraints, such as but not limited to adhering to a target budget. In such a case, the algorithm may allow some paths not to have a traffic reduction utility, so as to lower the cost and comply with budget limitations. This can be done by adding iterations in which paths with low load cost are selected and removed from the set of constraints, until the selected node set adheres to the target budget.

It should be noted that while embodiments of the systems and methods mentioned herein refer to the design phase of a network topology, they can also be used when changes to the network topology take place, for example when more endpoints and intermediate nodes are added. New paths created by the new nodes may be taken into account as input. The method may be used to compute where, if any, additional traffic reduction entities should be placed at intermediate nodes of the network.

In some networking infrastructures, all intermediate nodes may have the resources to become traffic reduction entities: The traffic reduction functionality may be turned on or off according to the changing topology of the network, optionally in real time. This may be particularly useful in dynamic network topologies. An operation cost may be assigned to each of the intermediate nodes, reflecting a cost value of operating the node as a traffic reduction entity. The operation cost may be dynamically determined, for example and without limitation according to operation rates during different time of the day. In such a case, the system and method may be used to compute the intermediate nodes where traffic reduction functionality should be enabled on the dynamically changing network.

Some embodiments of the systems and methods may calculate a node set for locating traffic reduction entities on the network according to a target function based on a budget. The budget may reflect constraints related to allocation costs of traffic reduction entities within the network, for example and without limitation placing a limit to the total number of traffic reduction entities which can be located on the network.

Location of Traffic Reduction entities within networks where end-points generate massive data streams can reduce the cost for transferring the raw traffic of the streams all the way between source and destination endpoints across a network with limited resource capacities.

The methods as described above are used in the fabrication of integrated circuit chips.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems and methods will be developed and the scope of the terms a processor and a traffic reduction entity is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A computerized method of locating traffic reduction entities in a communication network, the method comprising:
    calculating a plurality of allocation cost values each estimates locating cost of one of a plurality of traffic reduction entities on one of a plurality of intermediate nodes of a communication network;
    calculating a plurality of excess load cost values each calculated according to bandwidth capacity and expected flow load between two adjacent intermediate nodes of said plurality of intermediate nodes;
    identifying a node set selected from said plurality of intermediate nodes using a target function based on said plurality of allocation cost values and said plurality of excess load cost values; and outputting instructions for locating said plurality of traffic reduction entities on said communication network according to said node set; wherein said cost values are calculated according to a cost of resources required for locating one of said plurality of reduction entities on each of said intermediate nodes; wherein said resources are selected from a group consisting of: Central Processing Unit (CPU) resources, energy power, memory, and quality of service routing agents.

2. The method of claim 1, wherein said excess load cost values are calculated according to a plurality of traffic paths, each of said plurality of traffic paths defined by a group of said plurality of intermediate nodes enabling traffic flow between at least one source network endpoint and at least one destination network endpoint in said communication network, such that each of said excess load cost values reflects traffic congestion limitations along said plurality of traffic paths.

3. The method of claim 2 wherein said traffic flow on each of said plurality of traffic paths is directed.

4. The method of claim 2, wherein said target function comprises summing said excess load cost values for at least a group of said plurality of traffic paths.

5. The method of claim 2, wherein identifying a node set comprises selecting at least one reduction entity along each of said plurality of traffic paths.

6. The method of claim 2, wherein said excess load cost values are each calculated according to a non-decreasing function of the distance between said at least one source network endpoint and said plurality of intermediate nodes in said communication network.

7. The method of claim 1, wherein said target function comprises summing allocation cost values corresponding to intermediate nodes in said node set.

8. The method of claim 1, wherein identifying a node set comprises computing said target function to be nearly minimized.

9. The method of claim 1, further comprising receiving a target budget for locating traffic reduction entities in said communication network and wherein identifying a node set comprises computing said target function according to said target budget.

10. The method of claim 1, wherein identifying a node set comprises iterative selection of intermediate nodes.

11. The method of claim 10, further comprising removing redundant intermediate nodes from said node set.

12. A computer program product for locating traffic reduction entities in a communication network, said computer program product comprising:
 a non-transitory computer readable storage medium;
 first program instructions to calculate a plurality of cost values, each estimates locating cost of one of a plurality of traffic reduction entities on one of a plurality of intermediate nodes of a communication network;
 second program instructions to calculate a plurality of excess load cost values each calculated according to load capacity and expected flow load between two adjacent intermediate nodes of said plurality of intermediate nodes;
 third program instructions to select a node set selected from said plurality of intermediate nodes using a target function based on said plurality of cost values and said plurality of excess load cost values; and fourth program instructions to output instructions for locating said plurality of traffic reduction entities on said communication network according to said node set;
 wherein said first, second, third and fourth program instructions are stored on said computer readable storage medium:
 wherein said cost values are calculated according to a cost of resources required for locating one of said plurality of traffic reduction entities on each of said intermediate nodes; wherein said resources are selected from a group consisting of: Central Processing Unit (CPU) resources, energy power, memory, memory, and quality of services routing agents.

13. A computerized method of enabling traffic reduction operation on a plurality of intermediate nodes linked in a communication network in real time, the method comprising:
 monitoring changes in at least one of a plurality of allocation cost values, each calculated according to at least one change in operation cost of one of said plurality of intermediate nodes as a traffic reduction entity;
 monitoring changes in at least one of a plurality of excess load cost values, each calculated according to excess load cost between two adjacent intermediate nodes of said plurality of intermediate nodes;
 identifying a node set selected from said plurality of intermediate nodes using a target function based on said plurality of allocation cost values and said plurality of excess load cost values; and enabling traffic reduction operation on a plurality of members in said node set; wherein said cost values are calculated according to a cost of resources required for operating one of said plurality of intermediate nodes as a traffic reduction entity; wherein said resources are selected from a group consisting of: Central Processing Unit (CPU) resources, energy power, memory, and quality of service routing agents.

14. The method of claim 13, wherein said excess load cost values are calculated according to a plurality of traffic paths, each of said plurality of traffic paths defined by a group of said plurality of intermediate nodes enabling traffic flow between at least one source network endpoint and at least one destination network endpoint in said communication network, such that each of said excess load cost values reflects traffic congestion limitations along said plurality of traffic paths.

15. The method of claim 14 wherein said excess load cost values are calculated according to topology changes in said network.

16. The method of claim 14, wherein identifying a node set comprises selecting at least one reduction entity to be allocated along each of said plurality of traffic paths.

17. A system for mapping traffic reduction entities on a plurality of intermediate nodes of a communication network, the system comprising:
 a processor device configured to operate:
 a cost allocation module which calculates a plurality of allocation cost values, each of location cost of one of a plurality of traffic reduction entities on each of said plurality of intermediate nodes;
 a load calculation module which calculates traffic excess load cost values, each by estimating load capacity and expected traffic load between two adjacent intermediate nodes of said plurality of intermediate nodes in said communication network; a node selection module which selects a node set from said plurality of intermediate nodes according to a target function based on said allocation cost values and said excess load cost values; and an output module which produces instructions for locating traffic reduction entities on said communication network according to said node set; wherein said cost values are calculated according to a cost of resources required for operating one of said plurality of intermediate nodes as a traffic reduction entity; wherein said resources are selected from a group consisting of: Central Processing Unit (CPU) resources, energy power, memory, and quality of services routing agents.

18. The system of claim 17, further comprising a path recognition module which identifies a plurality of traffic paths, each of said plurality of traffic paths defined by a group of said plurality of intermediate nodes enabling traffic flow between at least one source network endpoint and at least one destination network endpoint in said communication network, and wherein said load calculation module calculates said excess load cost values according to traffic congestion limitations along said plurality of traffic paths.

* * * * *